(12) United States Patent
Jurek

(10) Patent No.: US 8,733,639 B2
(45) Date of Patent: May 27, 2014

(54) METHOD AND DEVICE FOR COMMUNICATION BETWEEN AN AUTOMOBILE VEHICLE AND PAYMENT MEANS

(71) Applicants: Continental Automotive France, Toulouse (FR); Continental Automotive GmbH, Hannover (DE)

(72) Inventor: Gilles Jurek, Plaisance du Touch (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 0 days.

(21) Appl. No.: 13/654,477

(22) Filed: Oct. 18, 2012

(65) Prior Publication Data

US 2013/0098995 A1 Apr. 25, 2013

(30) Foreign Application Priority Data

Oct. 21, 2011 (FR) ...................................... 11 03226

(51) Int. Cl.
*G06K 5/00* (2006.01)
(52) U.S. Cl.
USPC ............ 235/380; 235/382; 235/383; 235/384
(58) Field of Classification Search
USPC ......... 235/382.5, 375, 380–384; 455/39, 558; 725/39–46
See application file for complete search history.

(56) References Cited

U.S. PATENT DOCUMENTS

| | | | | |
|---|---|---|---|---|
| 5,742,229 A * | 4/1998 | Smith | ............................ | 340/438 |
| 7,926,717 B2 * | 4/2011 | McIntosh | ...................... | 235/385 |
| 8,292,168 B2 * | 10/2012 | Vilnai et al. | ................... | 235/381 |
| 8,457,555 B2 * | 6/2013 | Morrissey et al. | ............ | 455/41.2 |
| 2002/0109610 A1 * | 8/2002 | Katz | ............................ | 340/932.2 |
| 2004/0203360 A1 * | 10/2004 | Yamagiwa | .................... | 455/41.1 |
| 2007/0197261 A1 * | 8/2007 | Humbel | ......................... | 455/558 |
| 2008/0208701 A1 | 8/2008 | Betancourt et al. | | |
| 2009/0289113 A1 * | 11/2009 | Vilnai et al. | ................... | 235/381 |
| 2012/0095812 A1 * | 4/2012 | Stefik et al. | ...................... | 705/13 |
| 2013/0082820 A1 * | 4/2013 | Tieman | ......................... | 340/5.61 |

FOREIGN PATENT DOCUMENTS

| | | |
|---|---|---|
| EP | 1 184 241 | 3/2002 |
| FR | 2 801 994 | 6/2001 |
| WO | 02/089077 | 11/2002 |

OTHER PUBLICATIONS

French Search report dated Jun. 19, 2012, in corresponding application FR 1103226.

* cited by examiner

*Primary Examiner* — Tuyen K Vo
(74) *Attorney, Agent, or Firm* — Young & Thompson

(57) ABSTRACT

Method and device for communication between an automobile vehicle and payment unit carried by a user in order to pay for an action carried out on the vehicle equipped with wireless communication elements (11) and the payment unit including at least one portable device equipped with wireless communication elements (22) for communicating with the vehicle via a wireless communication (A) and with a central server via a wireless communication (C) and an electronic payment card, the method including:
  equipping the payment card with wireless communication elements for communicating with the portable device via a wireless communication (B),
  equipping the payment card with storage elements,
  performing various steps for mutual recognition between the various elements of the device, and
  authorizing use of the payment card via authentication data for single use sent by the central server to the portable device then stored in the payment card.

15 Claims, 2 Drawing Sheets

Figure 1:
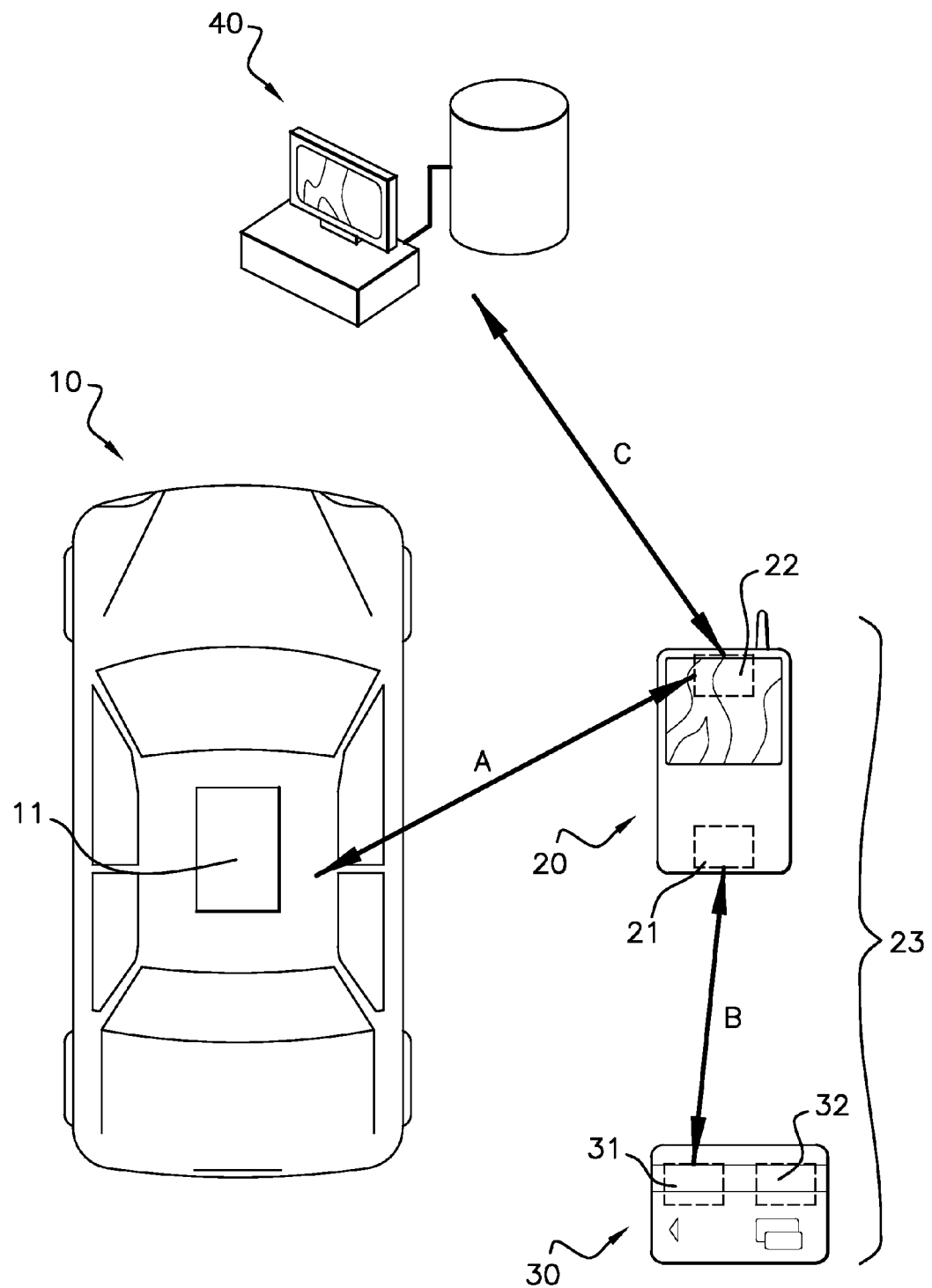

METHOD AND DEVICE FOR COMMUNICATION BETWEEN AN AUTOMOBILE VEHICLE AND PAYMENT MEANS

The present invention relates to a method and a device for communication between an automobile vehicle and payment means. In particular, the invention relates to a method for communication between a vehicle and payment means carried by the user of the vehicle in order to pay for an action carried out on the vehicle.

The invention is in particular applicable to rented or leased automobile vehicles, or vehicles shared between several users (auto-share), in other words to automobile vehicles not belonging to the user. The user of the rented, leased or shared vehicle must, when he uses it, make various payments relating to the use of the vehicle, such as: payment for refilling the vehicle tank with fuel, or payment of a road toll or again paying for a parking place.

In the case of fleets of vehicles intended for professionals, a known practice is to assign an electronic payment card to the user of the vehicle. This electronic payment card allows the user to pay for the refilling with fuel within the network of a specific fuel distributor who offers this card to professionals, without them having to use their personal bank card. This electronic payment card belongs to the manager of the vehicle fleet. A secret authentication code is communicated to the user in order to allow him to use it and to authorize the debit of the card for payments. However, this card is still an ordinary electronic payment card, in other words a bank card belonging to the car hirer or lessor and not to the lessee, and anyone who steals it can use it until the card is blocked if the fraudulent use is detected. Moreover, it is difficult for the manager of the vehicle fleet to know whether or not the user is using this payment card for personal expenditure, in other words whether or not he is filling the tank of his own vehicle rather than that of the rented vehicle.

In the case of vehicle auto-share networks, where the users of the shared vehicles are individuals, the problem relating to payment security is even more pronounced. There is a real need to improve the security of the electronic payment card of the hirer or of the auto-share agency against any fraudulent use by the user and against the theft of the card by a third party.

These are the problems that the invention is intended to solve. The invention provides a method and device for communication between an automobile vehicle and payment means to improve the security of the payment by the renter of an action carried out on the vehicle.

The invention provides a method for communication between an automobile vehicle and payment means carried by a user in order to pay for an action carried out on said automobile vehicle, said vehicle being equipped with means of wireless communication and the payment means comprising at least one portable device equipped with means of wireless communication for communicating with the vehicle via a wireless communication and for communicating with a central server via a wireless communication and an electronic payment card, the invention providing for:
the electronic payment card to be equipped with means of wireless communication for communicating with the portable device via a wireless communication,
the electronic payment card to be equipped with storage means,
and said method comprises the following steps:
step 110: by activation of the portable device, transmission from the vehicle to the portable device of an identifier specific to the vehicle and transmission from the electronic payment card to the portable device of an identifier specific to the electronic payment card,
step 120: prior to the performance of the action on the vehicle, comparison by the portable device of the identifiers received with identifiers pre-recorded during an initialization step,
step 140: if the identifiers match, transmission of these identifiers from the mobile telephone to the central server,
step 150: test for coherence of the data received by the central server,
step 160: if the coherence test is positive, transmission from the central server to the portable device of authentication data for the electronic payment card for single use,
step 170: transmission by the portable device of the authentication data for single use to the electronic payment card and storage in the electronic payment card, by the storage means, of the authentication data for single use,
step 180: performance of the action by the user,
step 190: payment by the user with the electronic payment card using the authentication data for single use.

In one embodiment, after the step 120, the method furthermore comprises the following step:
step 130: if the identifiers match, transmission from the vehicle to the portable device of data for the vehicles specific to the action to be carried out, and the step 140 consists in:
step 140: transmission by the portable device of the identifiers and of the data to the central server, In one embodiment, during the step 230, the transmission furthermore comprises data limiting the use of the authentication data for the electronic payment card. These limiting data comprise a maximum duration of use of the authentication data for single use and/or a maximum payment amount for the electronic payment card when using the authentication data for single use.

Advantageously, when the step 130 has been carried out, the invention also includes a verification performed in the following steps:
step 200: by activation of the portable device, transmission from the vehicle to the portable device of data for the vehicle specific to the action carried out,
step 210: transmission of this data from the portable device to the central server and comparison by the central server between the data for the vehicle specific to the action before and after its performance and correlation with the amount paid by the user with the electronic payment card,
step 220: transmission from the central server to the portable device of the result of the correlation.

Alternatively, the portable device is equipped with geopositioning means and during the steps 130 and 200, the geopositioning coordinates of the portable device are sent to the central server and, during the step 210, the comparison is carried out using the geopositioning coordinates of the portable device.

In one preferred embodiment, the action to be carried out consists in refilling the tank of the automobile vehicle with fuel.

The invention also relates to any device, and also to any automobile vehicle, implementing the communication method described hereinabove.

Figure 2:
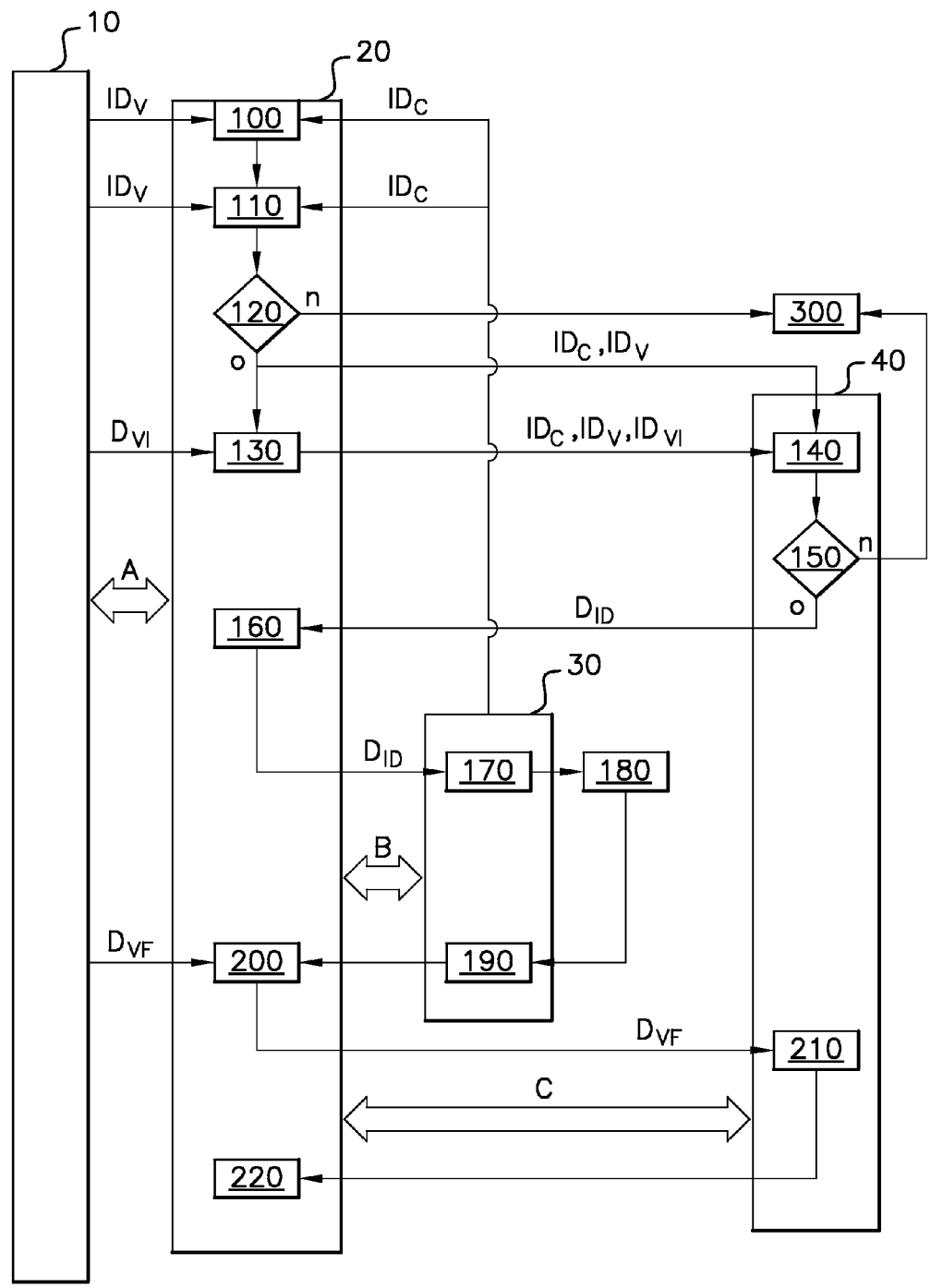

Other objects, features, and advantages of the present invention will become more clearly apparent from the description that follows by way of non-limiting example, presented with reference to the appended schematic drawings in which:

FIG. 1 shows a circuit diagram of the communication device according to the invention, and FIG. 2 shows a logic diagram of the method of communication according to the invention.

FIG. 1 shows the device for communication between an automobile vehicle 10 and payment means 23. These payment means 23 comprise a portable device 20 of the mobile telephone type and an electronic payment card 30 of the bank card type.

The automobile vehicle 10 is equipped with an onboard electronic system 11 possessing means for wireless communication of the Bluetooth®, Wifi® or NFC (Near-Field Communication) type which communicate with the portable device 20 via a wireless communication A. The portable device 20 is compatible with these means of communication, and is also equipped with wireless communication means 22.

The portable device 20 is furthermore equipped with near-field communication means of the NFC type 21. These means can be additional means integrated into the portable device 20 or can be identical to the wireless communication means 22 used for communicating with the vehicle 10.

The communication device furthermore comprises an electronic payment card 30.

The invention provides this electronic payment card 30 with means of wireless communication 31 of the NFC type in order to be able to communicate with the portable device 20 via a wireless communication B. The invention also provides this electronic payment card 30 with storage means 32 in order to store in it authentication data for single use. These authentication data consist, for example, of a bank card number for single use with which a secret personal code is associated, also called PIN (Personnel identification Number) code. The invention provides for this data to be storable in the electronic payment card 30 for a later single use of the latter, in other words to make a single payment with this authentication data.

The portable device 20 is connected to a central server 40 via a wireless communication C. This central server 40 manages the information relating to a vehicle leasing or auto-share fleet to which the automobile vehicle 10 belongs. In particular, it possesses the information relating to the type of vehicle 10 used, its license plate, or any other data, together with the data relating to the user, his identity, his mobile number, the number of days of use of the vehicle, etc.

The operation of such a communication device is presented hereinafter (cf. FIG. 2). The aim of the communication device, according to the invention, is to improve the security of the payment by the lessee for an action carried out on the vehicle during the lease or auto-share period. This action may consist in the payment by the lessee for refilling the tank with fuel for example, or the payment of a road toll, etc.

Prior to any use of the vehicle 10 by the user, there is a step 100 for initialization during which the portable device 20 recovers, upon request from the user who, for this purpose, activates a specific application in his portable device 20, an identifier $ID_V$ specific to the rented, leased or shared vehicle 10 and an identifier $ID_C$ specific to the electronic payment card 30, which has been allocated to it during the lease or rental period or that it already possesses. The portable device 20 then stores these identifiers $ID_V$ and $ID_C$ in its memory using the storage means 32 for later reference. This initialization step 100 takes place when the user makes his request for the loan of the vehicle 10, in other words when he is at the counter of the rental or leasing agency or of the auto-share agency.

When the user wishes to carry out an action on the vehicle, for example refilling the tank with fuel, the second step 110 of the communication method consists in a step for mutual recognition between the various elements of this device. This step is therefore placed prior to the performance of the action by the user. By activating his portable device 20, using a specific application, the user triggers the transmission of an identifier $ID_V$ specific to the vehicle 10 by the onboard system 11 of the vehicle to the portable device 20 via wireless communication A. The portable device 20 is equipped, for the triggering of this transmission, with an application activated by the user and which is specific to the action that the user wishes to carry out with his vehicle 10, for example an application entitled "request for authorization to refill fuel tank" on the display of his portable device 20. When this application is run by the user, the portable device 20 triggers the wireless communication A with the onboard system of the vehicle 11.

Similarly, once running, this application triggers a wireless communication B between the portable device 20 and the electronic payment card 30. During this wireless communication B, the electronic payment card 30 also sends to the portable device 20 an identifier $ID_C$ specific to it.

The portable device 20 then compares (step 120) the identifiers received $ID_C$, $ID_V$ with those which have been pre-recorded in its memory during the step 100, when he was at the counter of the rental, leasing or auto-share agency. If the identifiers $ID_V$, $ID_C$ received match those stored in the memory of the portable device 20, then this information $ID_C$, $ID_V$ is sent (step 140) from the portable device 20 to the central server 40 of the rental or leasing agency or of the auto-share agency via a wireless communication C. Otherwise, the application is halted (step 300) because the identifiers $ID_V$, $ID_C$ sent are not recognized by the portable device 20.

These data values $ID_C$, $ID_V$, are analyzed by the central server 40 during the step 150. If they are coherent, in other words if the identifier $ID_V$ of the vehicle corresponds to a rented or leased vehicle and the payment card and also the mobile telephone correspond to those used during the initialization step, step 100, then the central server 40 sends (step 160) an authorization to debit the electronic payment card 30 to the portable device 20, by sending it authentication data $D_{ID}$ for single use, in other words an electronic payment card number coupled with a secret access code (PIN or Personal Identification Number code) associated with it, both for single use. Otherwise, if the data values $ID_C$, $ID_V$ are not coherent, the central server 40 halts the application on the portable device 20 (step 300) because the request is not authorized. It can optionally inform the user by sending a message onto his portable device 20 (step not shown).

In another embodiment, if the identifiers $ID_V$, $ID_C$ received match those stored in the memory of the portable device 20, then the onboard system 11 of the vehicle additionally sends, upon request from the portable device 20, data $D_{VI}$ for the vehicle 10 specific to the action to be carried out (step 130). This transmission is triggered by the same application on the mobile telephone 20. For example, if the action consists in refilling the tank with fuel, then the data values $D_{VI}$ for the vehicle specific to this action are, for example, the current level of fuel in the tank and the number of kilometers travelled by the vehicle 10.

This information is normally stored in the onboard electronic system of the vehicle 11 and is sent via the wireless communication A to the portable device 20.

This information $D_{VT}$ is sent at the same time as the identifiers $ID_C$, $ID_V$ (step 140) from the portable device 20 to the central server 40.

Then, in this embodiment, the coherence test carried out in the step 150 by the central server 40 uses this data $D_{VT}$, and verifies, for example, that the level of fuel in the tank is low enough, or that the number of kilometers travelled since the last refilling is high enough to justify a request to refill the tank with fuel. If they are coherent, then the step 160 proceeds as described hereinabove.

After the step 160, the card number and the access code $D_{ID}$ are sent by the portable device 20 to the electronic payment card 30 via the wireless communication B (step 170), where they are stored in the memory of the electronic payment card 30 by the programming means 32. This storage in memory is necessary in order to authorize a later single use of the electronic payment card 30 with this same authentication data $D_{ID}$.

The electronic payment card 30 having thus stored the authentication data $D_{ID}$, the user then carries out the action, in the example here, the refilling of the tank of the vehicle 11 with fuel (step 180). Subsequently, this action is paid for by paying for the corresponding volume of fuel with the electronic payment card 30 (step 190) to which a card number for single use has been assigned and by using the access code for single use communicated to it by the central server 40, in other words by typing it into the bank card terminal provided for this purpose.

In a first embodiment, when the card number and the access code $D_{ID}$ are transmitted to the portable device 20 (step 160), the central server 40 limits the maximum amount of the transaction authorized on the electronic payment card 30 with the transmission of the authentication data $D_{ID}$, and/or limits the period of time for use of the latter.

Then, the action having been carried out and its payment made (steps 180 and 190), in a second embodiment, the invention provides a step for verification (step 200) that the payment made does effectively correspond to the action carried out. This step is useful in the case of the verification of a certain amount paid, for example the payment corresponding to refilling the tank with fuel. In the case of the payment of a road toll, of a smaller amount, this verification is not as useful.

For this purpose, upon request from the user by activating the corresponding application in his portable device 20, data $D_{VF}$ for the vehicle 11 relating to the action carried out (current number of kilometers and new level of fuel in the tank) are sent by the onboard system of the vehicle 11 to the portable device 20 (step 200) via the wireless communication A. This data $D_{VF}$, thus received by the portable device 20, is subsequently transmitted from the portable device 20 to the central server 40 via the wireless communication C. Upon receiving this data $D_{VF}$, the central server 40 compares it (step 210) with the vehicle data $D_{VT}$ which has been sent before the action is carried out in order to perform a coherence test and/or a test for correlation between the volume of fuel added and the amount debited on the electronic payment card 30. The central server 40 also verifies that the number of kilometers on the clock has not changed, in other words that the vehicle 10 has not moved between the action request from the user, that is to say between the request for authorization of payment during the step 130, and the payment made (step 190). Indeed, if the vehicle 10 has moved, then potentially refilling of the tank might not have been carried out, or has not been carried out in the same station service in which the vehicle was located when he requested the authorization, and the payment is not justified. This verification therefore enhances the security of the device with regard to a fraudulent payment. Indeed, the user could make the request for authorization of payment in a service station, then carry out the refilling with fuel in another where the fuel is cheaper, allowing him when the payment is made to purchase something else with the difference in price created. Moreover, since the correlation is performed between the volume of fuel added and the amount of the payment, if the vehicle 10 has moved, then the information relating to the new level of fuel, after refilling, is erroneous (since there has been consumption of fuel) and the result of the coherence test is false.

During the step 210, the central server 40 performs a correlation between the volume of fuel added and the sum paid. For this purpose, the central server 40 uses a database in which the price of the fuel is regularly updated.

In a third embodiment, the portable device 20 is equipped with geopositioning means (or GPS), and the GPS coordinates of the portable device 20 are sent to the central server 40 during the steps 130 and 200. These coordinates GPS allow the central server 40 to find the service station located near to the portable device 20, hence the service station in which the vehicle 11 is located and the price of the fuel that has been paid. The central server 40 compares the GPS coordinates before and after the action and verifies that the vehicle has not moved.

Finally, the central server 40 communicates the result of this correlation to the portable device 20 (step 220) of the user by means of the wireless link C. The central server 40 thus informs the user whether the amount paid corresponds to the volume of fuel added, or whether it does not correspond. Since the central server 40 is in communication with the rental or leasing agency or auto-share agency for the vehicle 10, the agency is itself, by means of this central server 40, also informed of the result of this correlation.

The invention therefore allows the payment for an action carried out by a user on an automobile that he is renting or leasing or that he shares with other users to be made more secure. This action may consist in the refilling of the tank, but also in the payment of a road toll, of a parking space or of a repair, etc.

The links created between the vehicle, the portable device belonging to the user, the payment card for single use and the central server prevent any fraudulent use by the user or by a third party. In addition, the invention allows the use of existing payment terminals, since the bank card operates in a usual manner with an electronic chip or a magnetic strip, known per se.

The invention is not limited to the embodiments described and may be extended to any other rented, leased or shared device.

The invention claimed is:

1. A method for communication between an automobile vehicle (10) and payment means (23) carried by a user in order to pay for an action carried out on said automobile vehicle (10), said vehicle (10) being equipped with a means of wireless communication (11) and the payment means (23) comprising at least one portable device (20) equipped with a means of wireless communication (22) for communicating with the vehicle (10) via a wireless communication (A), and for communicating with a central server (40) via a wireless communication (C) and an electronic payment card (30), said method being characterized in that:

the electronic payment card (30) is equipped with means of wireless communication (31) for communicating with the portable device (20) via a wireless communication (B), the electronic payment card (30) is equipped with storage means (32), and in that the method comprises the following steps:

step 110: by activation of the portable device (20), transmission from the vehicle (10) to the portable device (20) of an identifier ($ID_V$) specific to the vehicle (10) and transmission from the electronic payment card (30) to the portable device (20) of an identifier ($ID_C$) specific to the electronic payment card (30), step 120: prior to the performance of the action on the vehicle (10), comparison by the portable device (20) of the identifiers received ($ID_C$, $ID_V$) with identifiers pre-stored during an initialization step (step 100), step 140: if the identifiers ($ID_C$, $ID_V$) match, transmission of these identifiers from the portable device (20) to the central server (40), step 150: test for coherence of the received data ($ID_C$, $ID_V$) by the central server (40), step 160: if the coherence test is positive, transmission from the central server (40) to the portable device (20) of authentication data ($D_{ID}$) for the electronic payment card (30) for single use, step 170: transmission by the portable device (20) of the authentication data ($D_{ID}$) for single use to the electronic payment card (30) and storage in the electronic payment card (30), by the storage means (32), of the authentication data ($D_{ID}$) for single use, step 180: performance of the action by the user, step 190: payment by the user with the electronic payment card (30) using the authentication data ($D_{ID}$) for single use.

2. The method as claimed in claim 1, characterized in that, after the step 120, the method furthermore comprises the following step:

step 130: if the identifiers ($ID_C$, $ID_V$) match, transmission from the vehicle (10) to the portable device (20) of data ($D_{VT}$) for the vehicle (10) specific to the action to be performed, and in that the step 140 consists in:

step 140: transmission by the portable device (20) of the identifiers and of the data ($ID_C$, $ID_V$, $D_{ID}$) to the central server (40).

3. The method as claimed in claim 1, characterized in that, during the step 160, the transmission furthermore comprises data limiting the use of the data ($D_{ID}$) for authentication of the electronic payment card (30).

4. The method as claimed in claim 3, characterized in that this limiting data comprises a maximum duration of use of the authentication data ($D_{ID}$) for single use and/or a maximum payment amount for the electronic payment card (30) when using the authentication data ($D_{ID}$) for single use.

5. The method as claimed in claim 2, characterized in that the method furthermore comprises the following steps:

step 200: by activation of the portable device (20), transmission from the vehicle (10) to the portable device (200) of data ($D_{VF}$) for the vehicle (10) specific to the action performed, step 210: transmission of this data ($D_{VF}$) from the portable device (20) to the central server (40) and comparison by the central server (40) between the data ($D_{VT}$, $D_{VF}$) for the vehicle specific to the action before and after its performance and correlation with the amount paid by the user with the electronic payment card (30), step 220: transmission from the central server (40) to the portable device (20) of the result of the correlation.

6. The method as claimed in claim 5, characterized in that the portable device (20) is equipped with means for geopositioning and, during the steps 130 and 200, the geopositioning coordinates of the portable device (20) are sent to the central server (40).

7. The method as claimed in claim 6, characterized in that, during the step 210, the comparison is carried out by using the geopositioning coordinates of the portable device (20).

8. Method as claimed in claim 1, characterized in that the action to be performed consists in refilling the tank of the automobile vehicle (10) with fuel.

9. The method as claimed in claim 2, characterized in that, during the step 160, the transmission furthermore comprises data limiting the use of the data ($D_{ID}$) for authentication of the electronic payment card (30).

10. The method as claimed in claim 9, characterized in that this limiting data comprises a maximum duration of use of the authentication data ($D_{ID}$) for single use and/or a maximum payment amount for the electronic payment card (30) when using the authentication data ($D_{ID}$) for single use.

11. The method as claimed in claim 3, characterized in that the method furthermore comprises the following steps:

step 200: by activation of the portable device (20), transmission from the vehicle (10) to the portable device (200) of data ($D_{VF}$) for the vehicle (10) specific to the action performed, step 210: transmission of this data ($D_{VF}$) from the portable device (20) to the central server (40) and comparison by the central server (40) between the data ($D_{VT}$, $D_{VF}$) for the vehicle specific to the action before and after its performance and correlation with the amount paid by the user with the electronic payment card (30), step 220: transmission from the central server (40) to the portable device (20) of the result of the correlation.

12. The method as claimed in claim 4, characterized in that the method furthermore comprises the following steps:

step 200: by activation of the portable device (20), transmission from the vehicle (10) to the portable device (200) of data ($D_{VF}$) for the vehicle (10) specific to the action performed, step 210: transmission of this data ($D_{VF}$) from the portable device (20) to the central server (40) and comparison by the central server (40) between the data ($D_{VT}$, $D_{VF}$) for the vehicle specific to the action before and after its performance and correlation with the amount paid by the user with the electronic payment card (30), step 220: transmission from the central server (40) to the portable device (20) of the result of the correlation.

13. The method as claimed in claim 2, characterized in that the portable device (20) is equipped with means for geopositioning and, during the steps 130 and 200, the geopositioning coordinates of the portable device (20) are sent to the central server (40).

14. The method as claimed in claim 3, characterized in that the portable device (20) is equipped with means for geopositioning and, during the steps 130 and 200, the geopositioning coordinates of the portable device (20) are sent to the central server (40).

15. The method as claimed in claim 4, characterized in that the portable device (20) is equipped with means for geopositioning and, during the steps 130 and 200, the geopositioning coordinates of the portable device (20) are sent to the central server (40).

* * * * *